June 14, 1960 G. H. BINGHAM, JR 2,940,095
MEANS FOR POSITIONING SLIDE FASTENERS IN
ARTICLES OF MANUFACTURE
Filed April 14, 1958 2 Sheets-Sheet 1
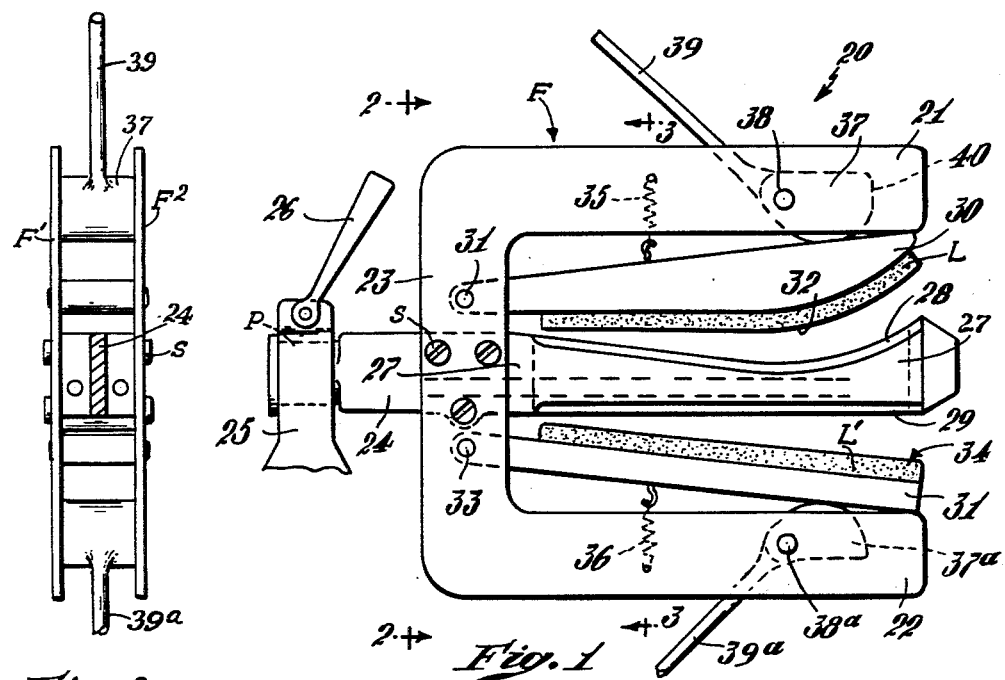
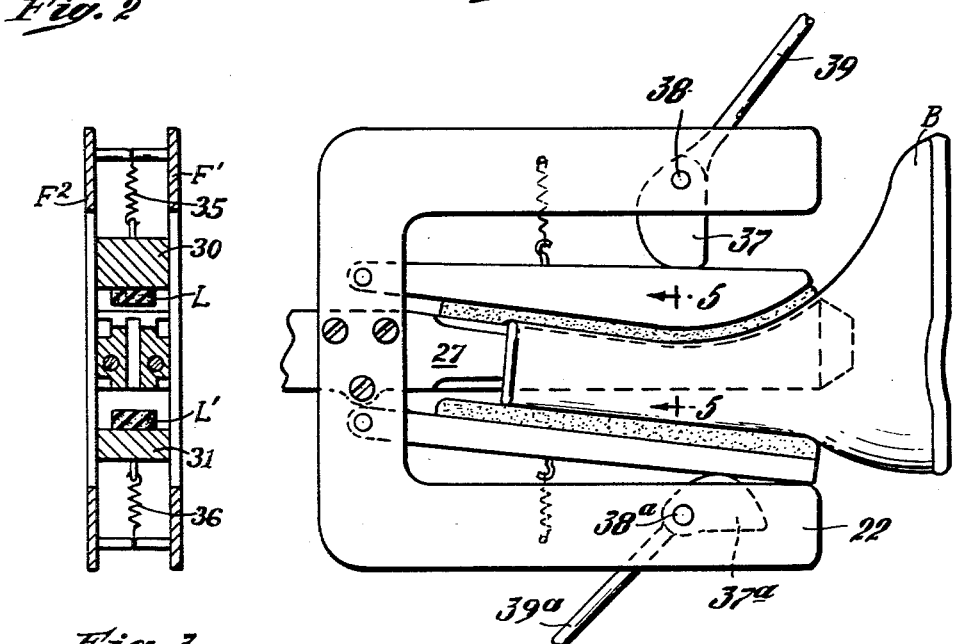
Inventor
George H. Bingham, Jr.
by Roberts Cushman & Grover
Att'ys June 14, 1960 G. H. BINGHAM, JR 2,940,095
MEANS FOR POSITIONING SLIDE FASTENERS IN
ARTICLES OF MANUFACTURE
Filed April 14, 1958 2 Sheets-Sheet 2

Inventor
George H. Bingham, Jr.
by Roberts Cushman Grover
Attys

United States Patent Office 2,940,095
Patented June 14, 1960

2,940,095

MEANS FOR POSITIONING SLIDE FASTENERS IN ARTICLES OF MANUFACTURE

George H. Bingham, Jr., Westminster, Md., assignor to Cambridge Rubber Company, Taneytown, Md., a corporation of Maryland Filed Apr. 14, 1958, Ser. No. 728,200

4 Claims. (Cl. 12—53.5)

This invention pertains to the manufactures of waterproof footwear, in particular footwear in which the waterproofing medium is a synthetic plastic, and relates more especially to apparatus for applying pressure to certain areas of such an article, hereafter referred to for convenience as a "boot," particularly after the plastic comprised in the boot has been completely fused. The plastic customarily employed in footwear manufacture is unlike rubber in respect to the fact that rubber, when once fully vulcanized, does not again become moldable or tacky by the mere application of heat (at temperatures below such as would cause a permanent change in the character of the material). On the other hand, the plastic material, after fusion or curing to the extent that it is no longer plastic or tacky, may, by the application of heat be restored to a plastic or moldable condition without change in character, chemical structure or permanent injury. Thus, it is possible, if desired, to make plastic boots by mass production methods such that the resultant boots may be termed "stock" articles, all alike, but which lack certain features of ornament, trim or the like desirable in a marketable boot. Such stock boots may be placed in storage and then, when demand arises for a boot having certain specified external ornamental patterns, or trim (for instance an internal reinforcing tape, slide fastener or the like), subjecting the boot to localized heat such that it becomes plastic or tacky at the desired area. The exterior surface of the boot may then be molded to a desired pattern at such area, or have adhered to it desired parts or elements either at the interior or exterior of the boot, thus providing a commercial article of the desired type. This cuts cost of production and expedites the filling of orders for boots embodying specific desired features.

The present invention concerns apparatus for use in the localized treatment of such a stock boot by the application of heat and pressure. Incidentally, the same apparatus is of utility, in some instances at least, in the repair of boots which, upon inspection after the completion of the molding process, show irregularities or imperfections. One object of the invention is to provide simple, durable and easily operable means for locally heating a desired area of a plastic boot, and for applying pressure to such heated area. A further object is to provide apparatus useful in securing textile tape, for example the tapes of a slide fastener, to the interior of a plastic boot which has already been completely fused. A further object is to provide apparatus useful in securing the tapes of a slide fastener to the interior of a completely fused boot either at the curved forepart of the boot upper or to the substantially straight side portion of the boot upper. A further object is to provide apparatus for simultaneously applying heat and pressure to a selected area of the plastic boot upper. A further object is to provide apparatus for securing the tapes of a gusset-type slide fastener to the interior of a completely fused boot upper. A further object is to provide apparatus for imparting to the exterior surface of a completely fused boot upper, an ornamental or other desired pattern. A further object is to provide means whereby a plastic material, such as is employed in making boot or shoe uppers, may be made pervious to air and moisture, thus overcoming one of the objections heretofore made to the use of plastic or similar materials in shoes. A further object is to provide apparatus useful in the repair of molded and fused boots, which upon inspection are found to have imperfections. A further object is to provide apparatus useful in locally heating and applying pressure to a completely fused plastic boot and which is so devised as to expedite the treatment of boots by a method in which such local heating and pressure is required. Other and further objects and advantages of the invention will be pointed out in the following more detailed description and by reference to the accompanying drawings wherein:

Fig. 1 is a fragmentary side elevation of a bench-type machine embodying the present invention, showing the parts in readiness for the reception of a boot to whose front portion a slide fastener is to be applied;

Fig. 2 is a section on the line 2—2 of Fig. 1;

Fig. 3 is a section on the line 3—3 of Fig. 1;

Fig. 4 is a view similar to Fig. 1, but showing a boot in position in the machine and with the parts arranged for simultaneously applying heat and pressure to the front portion of the boot upper;

Figure 5:
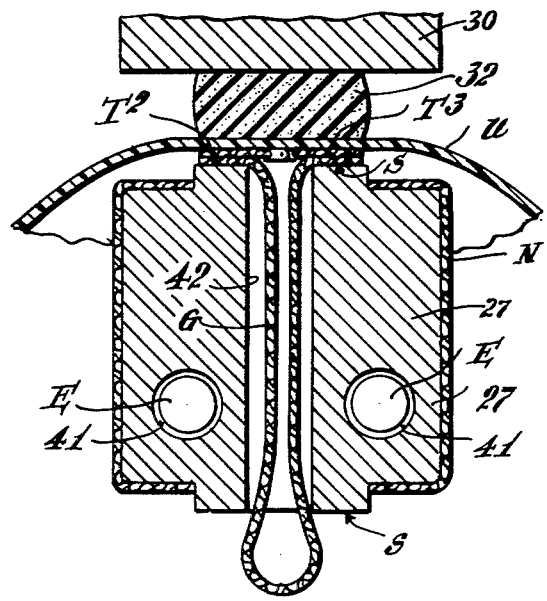
Fig. 5 is a fragmentary section, to larger scale than Fig. 4 and on the line 5—5 of Fig. 4, illustrating the operation of securing a gusset-type slide fastener to the front portion of the boot upper.

Referring to the drawings and in particular to Figs. 1 to 4 inclusive, the numeral 20 designates one unit of apparatus useful in the practice of the invention, such unit comprising a rigid U-shaped frame F having the spaced, horizontal, parallel arms 21 and 22 which, as shown in Fig. 1, are integrally joined at their left-hand ends to the normally vertical base member 23. As shown in Fig. 1, the member 23 is provided with a hub 24 having a cylindrical pintle portion P which is designed to turn in bearings in a supporting bracket 25 and which may be retained or locked against rotation in any suitable way, for example by the employment of a split bearing and clamping means, including the hand lever 26, for constricting the bearing about the cylindrical portion of the hub 24. Any suitable means may be provided, if desired, although not necessary and not here shown, to insure that after the frame has been adjustably turned, the arms 21 and 22 will be in a vertical plane. As here shown, the frame F comprises two like, parallel plates F¹ and F², the hub 24 being a separate part interposed between the plates F¹ and F² and fixed thereto by screws or bolts S.

A fixed jaw 27 is secured to the base portion 23 of the frame F, desirably so that it may be removed and replaced by a jaw of a different configuration if desired. This jaw 27 is of metal or other good heat conducting material and, as shown, is of a length substantially equal to or somewhat longer than the arms 21 and 22. As here shown, the jaw 27 is provided with a surface 28 for contact with the boot upper which, as shown, is concavely curved to a contour so that it may have conforming contact with the inner surface of the forward part of the boot upper. The shape of this surface 28 may, if desired, be determined in accordance with the method described in my co-pending application, Serial No. 713,433 filed February 5, 1958 whereby it becomes possible to devise a curvature such that the surface 28 may have conforming contact with boot uppers of a wide range of styles and sizes.

This jaw 27 is also desirably provided, at the side opposite to the surface 28, with another upper contacting surface 29 which is here shown as substantially rectilinear and which is designed to contact the inner surface of the rear or side portion of the boot upper, such rear or side portion usually being approximately straight.

As illustrated in Fig. 5, the fixed jaw 27 is provided with one or more cavities or chambers 41 which are designed to receive electrical heating units of conventional type, such as indicated at E. Current for energizing these units may be supplied from any suitable source, preferably under control of a thermostat, not shown, whereby the temperature of the fixed jaw 27 may be maintained at a predetermined substantially uniform degree.

The unit 20, according to the present invention, is provided with a movable jaw 30 interposed between the arm 21 of the frame and the fixed jaw and pivotally secured at 31 to the member 23 of the frame and which has a surface 32 which, in shape, is complementary to the surface 28 of the fixed jaw 27. The jaw 30 may comprise a body portion of any desired substantially rigid material, for example aluminum, but desirably a material which does not conduct heat as freely as does a metal, for example, it may be of wood or some plastic not affected by the heat employed in the apparatus, and desirably that surface 32 of the jaw which is opposed to the fixed jaw is constituted by a layer L of resiliently yieldable material such, for example, as sponge rubber.

As here illustrated, a second movable jaw 31 is pivotally connected at 33 to the member 23 of the frame, and this jaw 31 is provided with an upper contacting surface 34 which is substantially rectilinear, that is to say, it is complementary to the surface 29 of the fixed jaw. As with the jaw 30, the surface 34 of the jaw 31 is preferably formed by a layer L¹ of resiliently yieldable material such as sponge rubber. Springs 35 and 36 normally tend to retract the jaws 30 and 31 from the fixed jaw 27. For moving the jaw 30 toward the fixed jaw 27, there is provided a lever-actuated cam 37 pivoted at 38 to the arm 21 of the frame and having the operating handle 39. This cam 37 has an eccentric surface such that, when the handle 39 is swung upwardly or to the right as shown in Fig. 1, the eccentric surface of the cam will gradually force the jaw 30 downwardly toward the fixed jaw, thereby compressing upper material interposed between the jaw surfaces 28 and 32. Desirably, the cam 37 is provided with an end surface 40 which is so contoured that, when the lever arm 39 has been swung so as to force the jaw 30 downwardly to the full extent of its upper compressing motion, the jaw 30 is locked in position by the resilient action of the pad L until the arm 39 is swung in the opposite direction. A cam 37ᵃ similar to the cam 37 is provided for moving the jaw 31 toward the fixed jaw, this cam 37ᵃ being pivoted at 38ᵃ to the jaw 22 and having an actuating handle 39ᵃ.

With this arrangement, if it be desired to apply a slide fastener, for example, to the front portion of a boot upper, the parts are arranged as shown in Fig. 1 and the boot upper is slipped over the fixed jaw 27 until it occupies a position such as shown in Fig. 4. The slide fastener will have previously been placed upon the upper surface 28 of the fixed jaw and temporarily secured to the latter, for example, by an adhesive of the Scotch tape variety or by means of prongs or similar tape-penetrating elements carried by the fixed jaw, the tapes of the fastener being coated with adhesive on that side which is to contact the boot upper. The handle 39 is then swung so as to move the jaw 30 down into the position shown in Fig. 4, thus firmly clamping the upper material between the surfaces 28 and 32. The parts are left in this position for a period of time long enough to permit the heat of the jaw 27 to soften the plastic of the boot upper sufficiently so that the adhesive coating upon the tapes of the fastener may make an integral bond with the plastic of the upper. A period of from 3 to 5 minutes is usually sufficient to accomplish this union of the parts, whereupon the lever 39 is moved back to the position of Fig. 1. The spring 35 then raises the jaw 30 and the boot may be withdrawn from the jaw 27 with the fastener properly secured to its inner surface, the boot then being finished in accordance with any customary procedure. Obviously, if the worker finds it more convenient, he may turn the frame about the axis of the pintle P to some other position.

If, instead of applying the slide fastener to the front of the boot upper, it is to be applied to the side of the boot upper, the frame 20 may be turned through an angle of 180° so as to bring the arm 22 uppermost, and with the flat face 29 of the fixed jaw 27 at the top. This turning of the frame 20 may be accomplished by first swinging the clamping lever 26 to relax the split bearing for the hub 24, thus permitting the frame and hub to be turned, whereupon the lever 26 is again moved to lock the parts in position. With the parts thus arranged, the slide fastener is placed upon the flat surface 29 of the fixed jaw 27, the boot is pulled over the jaw 27 and the jaw 31 is moved down into clamping position by actuation of the lever 39ᵃ, the process being carried out in other respects in the same way as when the fastener is to be applied to the front of the boot upper.

Figure 7:
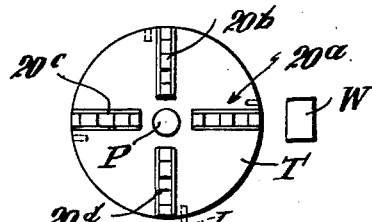
Fig. 7 is a diagrammatic plan view (to small scale) of a machine embodying four units such as that disclosed in Fig. 1, the several units being mounted upon a rotatable support whereby, while one boot is undergoing the heating and pressing operation, another boot may be arranged in readiness to receive heat and pressure.

Because a measurable period of time is required for the heating of the plastic material of the boot upper as above-described, it would be necessary, were the operator supplied with but one of the devices shown in Fig. 1, for the operator to wait idly during this period so that a substantial loss of time would result. To avoid such a situation, it is proposed to provide each operator with a plurality of the devices shown in Fig. 1, for example, arranged in suitably spaced relation upon a bench or other support so that while the fusing operation is being carried out upon one boot upper clamped between the jaws 30 and 27, for example, the operator may be placing another boot upper in another of these devices to start the fusing operation and removing a completed upper upon another of the devices. Instead of mounting these devices upon a stationary support such as a bench, an arrangement such as suggested in Fig. 7 may be employed wherein there is provided a rotary carrier T, mounted to turn about a pivotal axis indicated at P, and having mounted upon it, as here shown at 90° apart, a plurality of frames 20ᵃ, 20ᵇ, 20ᶜ, and 20ᵈ, each like the frame 20 of Fig. 1. The worker may be stationed as indicated at the position W where the frame 20ᵃ is readily accessible for actuation in the same way as above-described with respect to the frame 20, and having clamped a shoe upper between the movable and fixed jaws, the carrier T is then turned a quarter revolution, bringing the next frame 20ᵇ into operative relation to the working station W. The carrier is provided with appropriate locking means, for example a latch L (Fig. 7) engageable with any selected one of a plurality of circumferentially spaced sockets in the periphery of the carrier. The operator will then place a boot between the jaws of the frame 20ᵇ and again turn the carrier T a quarter turn and so on until eventually the frame 20ᵃ will again arrive at the working station W, at which time the operator may remove the completed boot from between the jaws and insert another boot. Thus, with this arrangement ample time is given for the fusing operation by which the tapes of the fastener are joined to the boot upper, and thus usefully conserving the worker's time.

Figure 6:
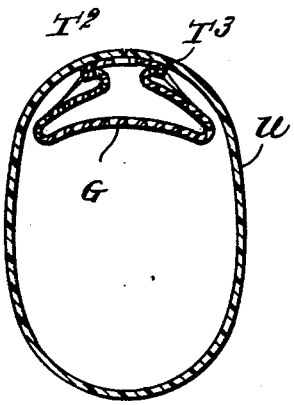
Fig. 6 is a diagrammatic transverse section through the boot upper, showing such a gusset-type slide fastener as having been secured to the interior of the boot upper.

As illustrated in Fig. 5, the surface S of the fixed jaw is desirably raised somewhat above the adjacent surface of the jaw 27 so as to keep the upper U of the boot away from the hot jaw, except at a relatively narrow area at which the fastener is to be attached. Further, in order to protect the upper from the heat of the jaw, the jaw may have a jacket N of heat-insulating material covering it at all sides except at the surface S. Desirably, the fixed jaw has a slot 42 extending through it from one surface S to the opposite surface S, the width of this slot slightly exceeding the width of the united series of metallic fastener elements, so that, when the parts are placed under pressure, the metallic fastener elements will be free to retreat downwardly into this slot, so that they will not interfere with the uniform application of pressure to the tapes of the fastener. This slot also provides a space to receive the gusset portion G of a gusset-type slide fastener during the fusing operation, it being noted, as shown in Figs. 5 and 6, that the margins of the gusset G are secured to the opposite tapes respectively of the slide fastener.

Figures 8, 9:
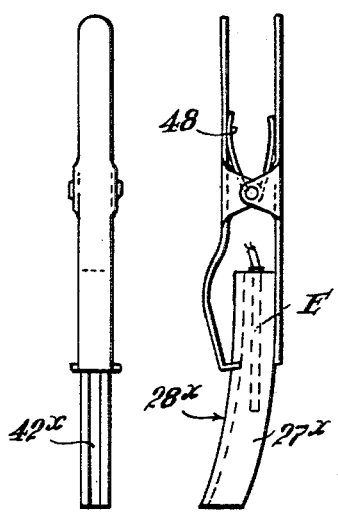
Fig. 8 is a fragmentary side elevation of a portable appliance embodying the same general principles as the device of Fig. 1, but which is of particular utility for repair work.
Fig. 9 is an elevation showing the device of Fig. 8 as seen from the left-hand side of Fig. 8.
Figure 10:
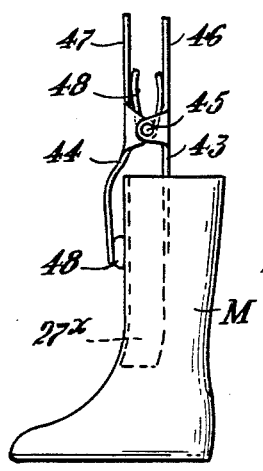
Fig. 10 is a side elevation showing the appliance of Fig. 8 as used in repairing a boot.

In Figs. 8, 9 and 10, there is shown an appliance comprising a heated jaw which may be employed, for example, for securing a slide fastened to the innner surface of a boot upper while the latter is within the mold M in which it was formed. It may be assumed, for example, that the boot upper within the mold M has been cured to a stage such that mere pressure is not sufficient permanently to adhere the tapes of a slide fastener to the plastic of the upper. The appliance shown in Figs. 8, 9 and 10 comprises jaw members 43 and 44 pivotally connected at 45 and provided with handles 46 and 47, respectively, whereby the jaws may be moved away from each other, the jaws being normally urged toward each other by a spring 48. The jaw 43 carries a member 27ˣ having a surface 28ˣ which may be of substantially the same shape as the surface 28 of the fixed jaw 27 of the apparatus shown in Fig. 1, the surface 28ˣ being of a contour such as to conform to that of the inner surface of the boot upper at the forepart of the latter. This member 27ˣ may be provided, if desired, with prongs or other means (not shown) for temporarily attaching the tapes of a slide fastener thereto. The other jaw 44 is provided with a pad 48 designed to contact the outer surface of the mold M. The part 27ˣ is provided with an internal chamber which receives a heating element E (Fig. 8) by which the part 27ˣ may be heated to any desired temperature. Preferably, the part 27ˣ is provided with a longitudinally extending slot 42ˣ (Fig. 9) for the same purpose as the slot 42 shown in Fig. 5. This appliance is portable and may be employed for repairing boots which are found to be imperfect in respect to the fact that the tapes of the slide fastener have not been secured properly to the upper in a previous operation, or it may be employed in attaching a slide fastener to a boot upper whether the latter be within or out of the mold M.

Desirably, the pad 48 is of a shape such that the pressure which it applies is distributed over a substantial area so that the appliance may be used for repairing or performing other operations upon the upper of a boot which is not within the mold.

Figures 11, 12:
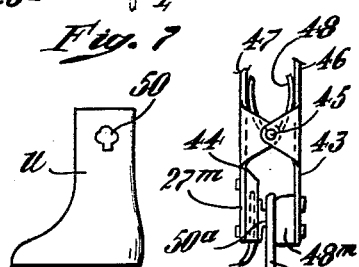
Fig. 11 is a diagrammatic side elevation of a boot showing, merely by way of example, an element of surface ornamentation on the exterior of the boot upper.
Fig. 12 is a fragmentary diagrammatic side elevation of a hand appliance such as may be employed for the production of such an element of ornamentation as shown in Fig. 11.

Figs. 11 to 15, inclusive, illustrate certain other capabilities of the type of apparatus herein disclosed. Fig. 11 shows the upper U of a plastic boot as provided at one side with an ornament 50 which may, for example, be a depression of desired ornamental shape in the outer surface of the boot. For providing the boot with such an element of ornament, an appliance similar to that shown in Figs. 9 and 10 may be provided except for a modified arrangement of its jaws. Such an appliance is shown in Fig. 12 as having the pad 48ᵐ mounted on jaw 43 which is designed to contact the inner surface of the boot top and a pad 27ᵐ mounted on jaw 44 which is designed to contact the outer surface of the boot top. This pad 27ᵐ is provided, on that face which engages the outer surface of a boot top, with a projecting boss 50ᵃ of the contour of the desired ornamental element 50 shown in Fig. 11. The pad 27ᵐ is also provided with an internal cavity which receives a heating element E. In the use of this device, the jaws 43 and 44 are separated and slipped down over the upper portion of the boot upper and then permitted to close upon the upper, thus causing the boss 50ᵃ to press against the outer surface of the upper. The heat of the jaw softens the material of the upper sufficiently so that the boss 50ᵃ embeds itself in the material, the parts being held in this position until the material of the upper has become stabilized, that is to say, until it has become stressed beyond its elastic limit so that when the device is removed from the upper, the latter permanently retains the impression 50 made by the boss 50ᵃ.

Figures 13, 14:
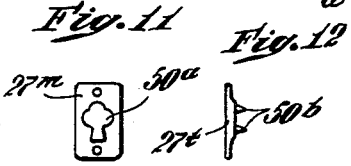
Fig. 13 is a fragmentary elevation showing that jaw of the appliance of Fig. 12 which is designed to form the oranament of Fig. 11.
Fig. 14 is a side elevation showing a jaw, similar to that of Fig. 13, but designed to form perforations in the material of the boot; and, Fig. 15 is a side elevation of a movable jaw, like the movable jaws of the device of Fig. 1, provided with heating means and means for impressing and perforating the boot upper.

In Fig. 14, there is shown a modification 27ᵗ of the pad 27ᵐ which, instead of the single projecting boss 50ᵃ, has a plurality of needle points 50ᵇ. By the use of such a device, it is possible to form permanent perforations extending completely through the boot upper which will not close when the device is removed from the upper. It is obvious that the shape of the boss 50ᵃ in Fig. 13 and the shape and arrangement of the needle points 50ᵇ in Fig. 14 are merely by way of illustration and in no sense limiting as to the shape of ornamentation or the number or kind of perforation which may be obtained by the use of this or equivalent device.

The device shown in Fig. 14 is by way of exemplification of means whereby plastic material comprised in, or which is to form a portion of a shoe, may be made pervious to moisture and air. Attempts to provide pores in rubber so as to make it more acceptable for use in footwear have not been successful. If rubber, whether partially or fully vulcanized, be penetrated by a needle or similar sharp pointed element, the resultant opening closes immediately the needle is withdrawn, and the same is true of plastic material, if the puncture is made by the use of a cold needle. If, instead of using a needle, a punch is employed which actually removes some of the material so as to leave a permanent opening, a very substantial weakening of the material results. Leather, rubber or plastic, so perforated and forming an article of wearing apparel, quickly loses its shape during use; and, if such material is to be incorporated in a shoe upper where it is subjected to an operation such as lasting during shoe manufacture, it stretches so much as to make the material, thus perforated, wholly impractical for the purpose.

In accordance with the present invention wherein a synthetic plastic is penetrated by a heated element, such as a needle, the plastic, even though previously fully cured, flows in response to the heat and so that it is penetrated by the needle without loss of any of the material or strength. If the needle remains in the material until the latter has taken a permanent set, that is to say, has again been fused, the opening resultant from the penetration by the needle is permanent and does not close when the needle is withdrawn. Thus, it becomes possible, if desired, by the use of a device carrying a multitude of heated needles or similar sharp pointed elements to make shoe upper material of plastic having all of the porosity of natural leather but without loss of strength, so that the material, so prepared, may be employed in making an article of footwear involving a conventional lasting operation. Obviously, the same means and procedure may be employed in preparing previous sheet plastic for use in making articles other than footwear.

Figure 15:

In Fig. 15, there is illustrated a jaw 30$^x$ similar to the jaw 30 of Fig. 1, but which, in this instance, would desirably be of metal having a rigid surface 32$^x$ opposed to the surface 28 (Fig. 1) of the fixed jaw 27, and this surface 32$^x$ would carry projecting elements such as indicated at 50$^d$ and 50$^e$ which, when pressed into the material of the boot upper, would impart thereto a desirable surface configuration, for example of ornamental character, or provide perforations extending through the material of the upper, all as desired, it being understood that a jaw such as the jaw 30$^x$ of Fig. 15 might be substituted for the jaw 30 of Fig. 1 for obtaining such special effects.

As respects the devices illustrated in Figs. 13 to 15, inclusive, it may be noted that such devices may be used for making designs upon other materials than the plastic of a boot upper, for instance, leather or fabric or combinations of plastic and rubber, and that, by the use of a hand implement such as that shown in Fig. 12, it is possible to apply ornament or form perforations in fully assembled and otherwise finished articles without employing heavy machinery or molds such as have customarily been thought necessary for such purposes. It is further noted that the devices of Figs. 13 to 15, inclusive, operate by fusing, displacing and curing the material in localized areas without affecting the condition of the material of the boot upper outside of of these local areas.

While certain desirable embodiments of the invention have herein been disclosed by way of example, it is to be understood that the invention is broadly inclusive of any and all modifications falling within the scope of the appended claims.

I claim:

1. Apparatus for use in applying localized heat and pressure to a plastic boot upper, said apparatus comprising a rigid frame supporting an elongate, normally stationary, substantially horizontal jaw of heat-conducting material having a cavity within which is located an electrical heating unit, the jaw having a longitudinally extending, work-contacting surface of a contour complemental to that of a selected portion of the inner surface of the upper of the boot to be processed, the frame also supporting an elongate movable jaw having a surface of a contour complemental to the work-contacting surface of the stationary jaw, means pivotally supporting the movable jaw so that it may be moved toward or away from the fixed jaw, a pad of resiliently yieldable, nonmetallic material mounted upon said surface of the movable jaw and which is designed to contact the outer surface of the boot upper, a cam operable to force the movable jaw toward the normally stationary jaw thereby to clamp the boot upper between the jaws, said cam being of a shape such that when exerting the maximum pressure it is locked in position by the resiliency of said pad, and means for moving the cam.

2. Apparatus according to claim 1, wherein the rigid frame comprises an arm which is substantially parallel to the normally fixed jaw, and a base member perpendicular to said arm, the normal stationary jaw being fixed at one end to said base member, the movable jaw being interposed between the stationary jaw and said rigid arm and pivotally connected at one end to the base member, means pivotally mounting the cam upon said arm, and a spring which urges the movable jaw away from the fixed jaw.

3. Apparatus according to claim 2, wherein the frame comprises two like members spaced apart by the interposition of the inner portion of the stationary jaw and rigidly held in parallel planes by fastener means uniting said like members to the stationary jaw, the cam being disposed between those members of the frame which constitute said rigid arm, and wherein the means for moving the cam comprises a handle fixed to the cam and which projects outwardly from between said frame members.

4. Apparatus according to claim 1, wherein the stationary jaw extends outwardly beyond said base member and is shaped to constitute a pintle, a bearing in which said pintle may turn thereby to permit the frame to be turned about the axis of the pintle, so as to adjust the jaws to convenient position for processing the boot, and means for clamping the pintle in adjusted position.

References Cited in the file of this patent
UNITED STATES PATENTS

| | | |
|---|---|---|
| 1,155,909 | Gibson | Oct. 5, 1915 |
| 1,904,787 | Hitzler et al. | Apr. 18, 1933 |
| 2,086,917 | Lattemann | July 13, 1937 |
| 2,674,559 | Zobel | Apr. 6, 1954 |